United States Patent [19]

Wienck

[11] Patent Number: 4,770,212

[45] Date of Patent: Sep. 13, 1988

[54] PRESSURE COMPENSATED FLOW RATE CONTROLLERS

[75] Inventor: Dennis A. Wienck, Duncan, Okla.

[73] Assignee: Halliburton Company, Duncan, Okla.

[21] Appl. No.: 1,130

[22] Filed: Jan. 7, 1987

Related U.S. Application Data

[62] Division of Ser. No. 808,786, Dec. 13, 1985, abandoned.

[51] Int. Cl.[4] .................................................. F15D 1/04
[52] U.S. Cl. ............................................. 138/45; 138/46
[58] Field of Search ................................ 138/40, 45, 46; 137/517, 504

[56] References Cited

U.S. PATENT DOCUMENTS

| | | | |
|---|---|---|---|
| 1,635,040 | 7/1927 | Fales | 138/45 X |
| 3,106,226 | 10/1963 | Machen | 138/45 |
| 3,431,944 | 3/1969 | Sakuma | 138/45 |
| 3,952,776 | 4/1976 | Eversole et al. | 138/45 |
| 4,022,113 | 5/1977 | Blatt | 138/45 |
| 4,361,166 | 11/1982 | Honaga et al. | 138/45 |
| 4,383,550 | 5/1983 | Sotokazu | 138/45 X |
| 4,542,766 | 9/1985 | Gawer et al. | 138/45 |

FOREIGN PATENT DOCUMENTS 74260 11/1960 France ................................ 138/45

Primary Examiner—James E. Bryant, III
Attorney, Agent, or Firm—James R. Duzan; Joseph A. Walkowski

[57] ABSTRACT

A flow controller apparatus having few moving parts that may be inserted directly into a flow line to be responsive to flow pressure and maintain the flow rate constant. The flow controller consists of a tubular frame section having an internal bore that is a revolutional chamber having a maximum cross-sectional diameter at the inlet end and tapering, either linearly or non-linearly, toward a minimum cross-sectional area across a throat portion. A control rod and differential pressure plate supported axially movably in said chamber is spring biased toward the inlet end of the chamber, and is movable in response to upstream flow pressure to adjust the cross-sectional fluid flow area to maintain a constant flow rate.

4 Claims, 3 Drawing Sheets

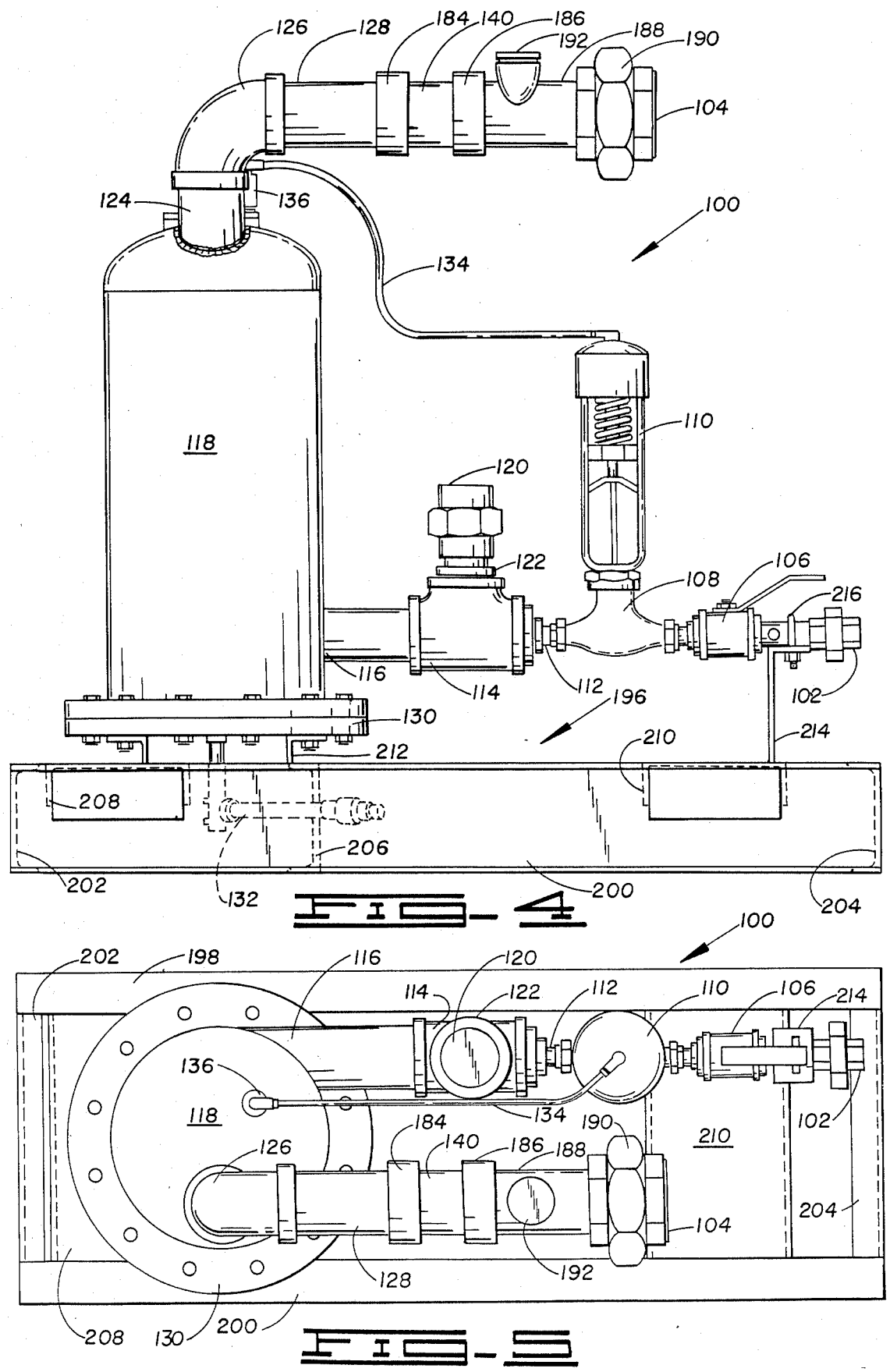

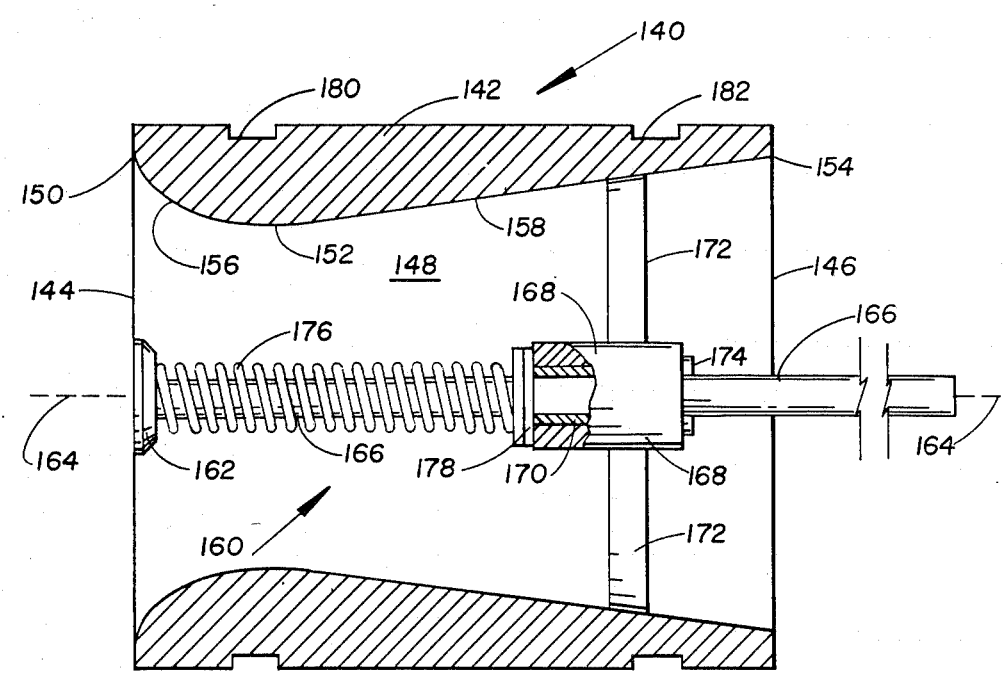
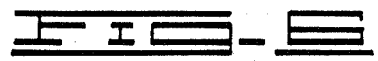

PRESSURE COMPENSATED FLOW RATE CONTROLLERS

This application is a division, of application Ser. No. 808,786, filed Dec. 13, 1985, now abandoned.

BACKGROUND OF THE INVENTION

1. Field of the Invention

The invention relates generally to pressure and flow rate control of fluid materials such as gas or liquid and, more particularly, but not by way of limitation, it relates to an improved flow rate controller that is responsive to fluid flow pressure to maintain a constant flow rate.

2. Description of the Prior Art

Applicants are aware of no prior art that functions in the manner of the present invention wherein fluid pressure within a flow way is directly utilized to control fluid flow through an orifice in such manner that a constant flow rate can be maintained. There are a number of prior teachings wherein responsive members have been placed in a fluid stream for the purpose of providing a force indication to an external monitoring or actuating facility. U.S. Pat. No. 3,269,181 in the name of Seay illustrates one form of flow responsive device that is responsive to solids flow, but the end function of this device is entirely different and provides no form of fluid flow regulation. Still other prior methods employ the basic steps of flow rate sensing with servo-controlled orifice adjustment, a very common type of flow control, but one that functions independently of the fluid pressure of fluid material within the conduit.

Differential pressure, as sensed across an adjustable metering orifice, is used on an automatic flow rate controller of a type that is commercially available from the W. A. Kates Co. of Deerfield, Ill. This controller utilizes a system of parallel fluid flow for regulation, one branch flowing through a first adjustable orifice, the other branch applying upstream pressure to vary a second orifice or flow passage. Yet another type of flow control valve may be identified as the Griswold valve. This valve provides in-line, pressure responsive control members for maintaining constant flow rate within a preselected pressure range. The control structure includes a spring loaded cup with specially designed orifices for movement in response to downstream pressure to regulate total fluid passage. In this case the tortuous cup orifices provide the total fluid passage at the rated maximum pressure flow rate along with any fluid flow at greater pressures.

SUMMARY OF THE INVENTION

The present invention provides a flow controller apparatus having few moving parts that may be inserted directly into a flow line to be responsive to flow pressure and maintain the flow rate constant. The flow controller consists of a tubular frame section having an internal bore that is a revolutional chamber having a maximum cross-sectional diameter at the inlet end and tapering, either linearly or non-linearly, toward a minimum cross-sectional area across a throat portion. A control rod and differential pressure plate supported axially movably in said chamber is spring biased toward the inlet end of the chamber, and is movable in response to upstream flow pressure to adjust the cross-sectional fluid flow area to maintain a constant flow rate.

In addition, the use of such flow rate controller enables the construction of a portable type of fluid pressure and flow rate control apparatus that is suitable for instantaneous set-up and usage in the many applications where it is necessary to reduce pressure and flow rate from a high pressure, high volume liquid or gas source for supply to a low pressure, low volume output requirement. The pressure apparatus consists of an inlet coupling with primary valve control connected through a pressure regulator to a relief valve, and output at reduced pressure is applied through a flow controller device, of a type to be described, that is responsive to maintain a constant, reduced pressure flow rate output for conduction and use as required. A contaminant separator may be utilized prior to the flow controller. The basic pressure apparatus may also include various optional components such as fluid cooling equipment, flow rate indicators, ancillary control valves, and a suitable form of skid base to enable easy movement and positioning at a work space.

Therefore, it is an object of the present invention to provide a flow controller apparatus that may be constructed inexpensively to provide a device of relative simplicity for long life, high reliability application.

It is also an object of the present invention to provide a flow restrictive control device that may be used to control the flow rate of liquids or gases when the stream pressure may vary by automatically adjusting the cross-sectional flow area therethrough.

It is still another object of the present invention to provide a fluid pressure control apparatus to control such as air output from large compressor equipment to adjust flow rate for best operation of pneumatic conveying apparatus.

Finally, it is an object of the invention to provide controller apparatus for use in many applications requiring a fixed flow rate of liquid or gas while outlet pressure may vary.

Other objects and advantages of the invention will be evident from the following detailed description when read in conjunction with the accompanying drawings which illustrate the invention.

BRIEF DESCRIPTION OF THE DRAWINGS

FIG. 4 is a view in elevation of a skid-mounted fluid pressure control apparatus;

FIG. 5 is a top plan view of the apparatus of FIG. 4; and

FIG. 6 is a side elevation in section of the specific flow controller device utilized in the apparatus of FIGS. 4 and 5.

DETAILED DESCRIPTION OF THE INVENTION

Figure 1:
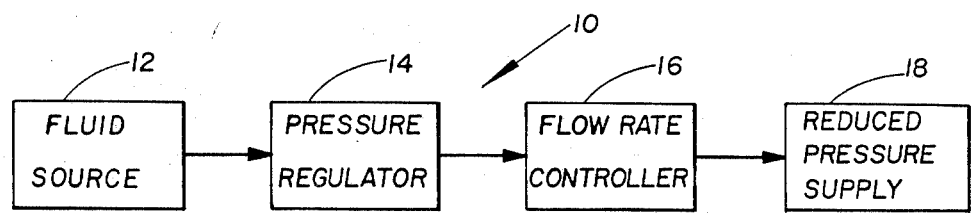
FIG. 1 is a block diagram of a basic flow control apparatus as constructed in accordance with the present invention.

Referring to FIG. 1, the apparatus 10 may be utilized to process a high volume, high pressure fluid flow for reduction to a reduced pressure but constant flow rate for a particular application, e.g. a pneumatic conveying system or the like. Thus, a fluid source 12 may be such as a very high volume compressor source, and the output is applied through a pressure regulator 14 of known and commercially available type for reducing the pressure down within the desired pressure range. Output flow of fluid from the pressure regulator 14 is then applied through a flow rate controller 16, as will be further described, which functions to maintain the fluid flow therethrough at a constant rate thereby to provide the output reduced pressure supply 18.

Figure 2:
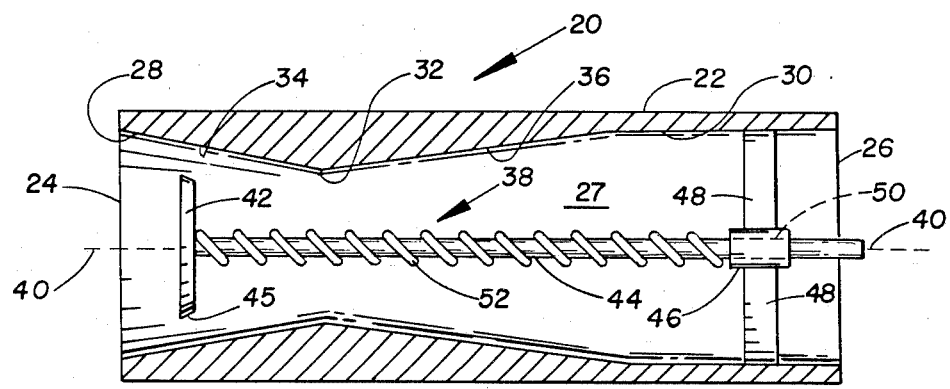
FIG. 2 is a side view in section and idealized form of one type of fluid flow controller device.

FIG. 2 illustrates one form of pressure compensated fluid flow rate controller device 20 consisting of a tubular section that may be mounted in a gas or liquid flow line. Device 20 consists of a tubular frame 22 having an inlet end 24 and an outlet end 26 and an axial chamber 27 therethrough. The chamber 27 is a surface of revolution or other suitable shape having maximum cross-sectional diameter at inlet lip 28 as well as along the outlet end surface 30. A minimum cross-sectional area is present across a throat 32 as the interior surface 34 tapers from maximum diameter at inlet lip 28 to minimum diameter at throat 32; and then, a further taper surface 36 progresses from the minimum diameter back toward the maximum diameter at the outlet end 30.

A flow restrictor 38 is slidably supported along an axis 40 of revolutional chamber 27. The flow restrictor 38 consists of a differential plate 42 supported transversely across chamber 27 by an axial rod 44. The differential plate 42 may be formed with a beveled edge 45 to optimize the response of differential plate 42 to changes in flow. The flow restrictor 38 is movably supported by a bushing-type rod guide 46 as positioned axially by a plurality of equi-spaced struts 48 secured about the inner wall 30. The rod guide 46 is formed with an axial bore 50 to slidingly receive the rod 44 therethrough, and a compression spring 52, seated between the rod guide 46 and the back side of differential plate 42, provides a continual bias towards the inlet end of chamber 27. The strength of compression spring 52, as well as the diameter of differential plate 42 and coactive minimum diameter at throat 32, may be adjusted variously to accommodate selected pressure and volume ranges of fluid flow as will be further described below.

In operation, as the device 20 is adapted to receive gas or liquid flow therethrough, a drop in pressure is created across the differential plate 42 at the inlet end 24. For any pressure differential, there will be a flow area that will give the required flow rate. Thus, the differential plate 42, spring 52 and tapered cylinder wall 34 down to throat 32 are sized to give the required flow area for every differential pressure that may occur within the intended range of usage of the device. The flow area will be that concentric area lying between pressure plate 42 and tapered wall 34. It may be noted from the particular design of FIG. 2 that when pressure plate 42 is transverse to inlet end 24, the desired flow rate is maintained with a relatively low pressure differential across differential plate 42; and when plate 42 spans across the throat portion 32, the desired flow rate is maintained at relatively high differential pressure across the differential pressure plate 42. In this case, the conical tapered wall 34 is a linear variation; however, this may not necessarily be the preferred design since some applications might require or better operate with a non-linear taper, as will be described.

When the differential pressure plate 42 is positioned within the cylinder token 34 for controlling the flow rate with a particular differential pressure, i.e. as appears across differential pressure plate 42, lowering of the pressure at outlet end 26 will result in an increase in the pressure differential. Thus, the increased pressure differential will tend to move plate 42 toward the outlet end and will compress the spring 52, shifting the pressure plate 42 rightward to narrow the concentric flow orifice therearound. This then results in a constant volumetric flow rate despite any changes in the pressure at the downstream end.

Figure 3:
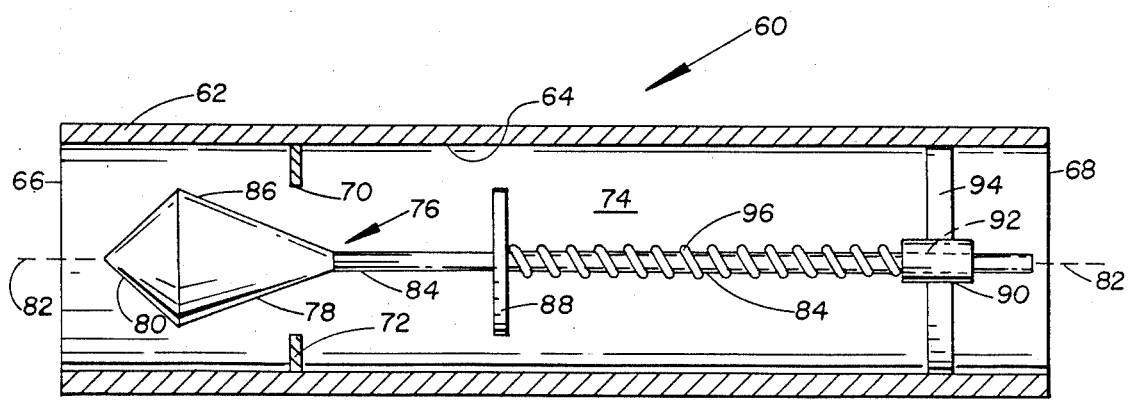
FIG. 3 is a side view in section of an alternative form of flow controller device.

FIG. 3 illustrates an alternative form of structure which functions upon the same flow restriction principle as the device 20 of FIG. 2. Flow controller device 60 is formed from a tubular frame 62 having a uniform diameter inside wall 64, an inlet end 66 and an outlet end 68. A minimum diameter throat 70 is formed by a concentric ring member or orifice plate 72 suitably secured as by welding at a selected point transversely within inner wall 64 and at a point proximate the inlet end, this being a design consideration. The minimum diameter of throat 70 is a selection controlled by the size of the co-active flow restrictor, and the intended pressure and volume ranges. The inside of tubular frame 62 forms a revolutional chamber 74 through which input gas or liquid flow must pass for regulation.

A flow restrictor 76 consists of a tapered control plug 78 having a reverse tapered conical forward face 80 as supported along chamber axis 82 by means of a rod 84. The rearward tapered surface 86 is formed of predetermined angular relationship to control rod 84, this also being a consideration of the minimum diameter to be regulated across opening 70, and a differential pressure plate 88 is disposed transversely on control rod 84 at a predetermined position downstream. Control rod 84 is axially supported for slidable disposition in a rod guide 90 having an axial bore 92 and being supported by a plurality of struts 94. A compression spring 96 of selected size and strength is then disposed between rod guide 90 and the differential pressure plate 88.

In operation, the flow controller device 60 receives input of gas or liquid under pressure at inlet end 66 and a drop in pressure is created across the differential pressure plate 88. For any particular pressure differential, there must be a flow area, i.e. through throat 70, which will give the required balance against compression spring 96 and therefore the required flow rate. The pressure plate 88, spring 96, orifice plate 72 and control plug tapered surface 86 are all selected to be of a size that will give the required cross-sectional flow area for every differential pressure within the design range of the device 60.

Thus, if the control plug 78 is positioned to control the fluid flow rate with a selected differential pressure, then lowering of the pressure at outlet end 68 will effectively increase the pressure differential across plate 88. This increased pressure differential will then compress the spring 96 and shift the tapered control plug 78 rightward thereby to reduce the flow area thorough orifice plate 72. Here again, the result is a constant fluid flow rate despite any changes in the pressure at outlet end 68. The device 60 may be primarily used to control the flow rate of liquids or gases when the downstream pressure may vary as the device automatically adjusts the area available for flow to maintain a fixed flow rate.

FIGS. 4 and 5 are directed to an assembly package for fluid pressure and volume regulation which utilize a flow controller device such as those previously described. Thus, a pressure control assembly 100 includes a high pressure inlet 102 and a controlled low pressure outlet 104 as inlet fluid is controlled by an input control valve 106. Control valve 106 may be such as a conventional Ball-type valve of selected size. Input valve 106 then connects to a Tee section 108 of a pressure regulator 110. Regulator 110 may be a commercially available type of regulator, and one present design application utilizes a RobertShaw-Fulton standard type Air Pressure Regulator—5-55PSI.

Reduced pressure output from regulator 110 is then via coupling 112 to a Tee section 114 and conduit 116 for tangential input into an oil and water separator 118. The Tee connector 114 includes a relief-valve or rupture disc 120 secured thereto as connected by a sealed bushing 122. Any of various comercially available rupture disc unions may be utilized to provide designated over pressure relief. The separator 118 may be any of various commercial separators used at the comparable pressure range, and output from separator 118 is via conduit 124, elbow 126 and conduit 128. The lower portion or base 130 of separator 118 includes a drain consisting of the conduit assembly 132 for draining oil, water and other contaminants from the fluid supply. A pressure sensing line consisting of a tubing 134 is connected from the pressure regulator 110 to a needle valve 136 mounted on separator 118.

The reduced pressure gas or liquid is applied from output conduit 128 to a flow controller 140 that is similar in operation to the devices illustrated in FIGS. 2 and 3; however, in this particular package assembly, the flow controller 140 is a specific design as shown more fully in FIG. 6. The device 140 consists of a tubular frame 142 having an inlet end 144 and an outlet end 146, and defining an axial revolutional chamber 148 that has a non-linearly varying inside diameter. That is, the inside diameter varies from a maximum diameter at point 150 through a generally uniform arcuate narrowing to a throat portion 152 having a minimum diameter and, thereafter, enlarging linearly to the maximum 154 at the outlet end 146. The arcuately tapering surface 156 is about one-third the length of the linearly tapered surface 158.

A flow restrictor 160 consists of a pressure plate 162 generally aligned with the inlet end 144 and supported normal to axis 164 and secured on a movable control rod 166. The control rod 166 is retained for longitudinal movement by means of a rod guide 168 with axial bushing 170. The rod guide 168 is axially supported by a plurality of struts 172 and a force-fit pin 174 restrains control rod 166 in its traverse under force of a compression spring 176 disposed around control rod 166 between such as seating washers 178 and differential pressure plate 162.

The outer surface of tubular frame 142 includes a pair of circumferential grooves 180 and 182 which function in the sealing operation. That is, and referring again to FIGS. 4 and 5, a pair of sealed couplings 184 and 186 of the Victaulic-type are utilized to place the flow controller 140 in the output flow conduit 128 prior to conduction through a conduit 188 to fluid output 104. The output 104 may include a quick-connect coupling 190, and conduit 188 may include a sight glass 192 or other means for indication of operation.

The entire pressure and flow rate control assembly 100 is mounted on a suitable skid 196 to enable moving and placement of the control assembly in the most convenient manner. The skid 196 is suitably formed of welded channel construction consisting of side channels 198 and 200 connected by respective end channels 202 and 204. A generally central partition brace 206 provides additional lateral support, and transverse channels 208 and 210 provide a limited amount of decking space. In addition, channels 208 and 210 provide slots for convenient lifting with the forks of a forklift tractor. The weld-secured brackets 212 provide secure footing for base 130 of separator 118, and a bracket 214 and U-bolt assembly 216 provide support for the apparatus inlet at control valve 106.

In operation, the package apparatus 100 provides the interconnection equipment necessary for use in reducing the pressure and flow rate from a high pressure, high volume liquid or gas source to supply low pressure, low volume output at controlled flow rate. Apparatus 100 essentially includes the pressure regulator 110 which serves to reduce the pressure down to the required level, and the serially connected flow rate controller device 140 then serves to reduce the flow rate. The combination also includes cleaning and control components such as input valve 106, relief valve structure or rupture disc 120, contaminant separator 118 and quick couplings for connection at inlet 102 and outlet 104. Still other ancillary components such as fluid cooling equipment, flow rate indicators, and the like may be included on the skid-mounted apparatus to incorporate still more complete function.

High pressure liquid or gas from a high volume source, is connected at inlet 102 for conduction through control valve 106 to the pressure regulator 110. That is, pressures on the order of 100-200 PSI at inlet 102 may then be adjusted downward through pressure regulator 110 to a lower pressure value. In a present design of the appratus 100, the pressure regulator 110 is used to bring the fluid pressure (air) down to 45 PSI and rupture disc 120 is set to provide over pressure protection relative to this value. The reduced pressure fluid is then applied through separator 118 for removal of oil, water or other contaminants, and output fluid pressure varying about the reduced figure is applied through the flow controller device 140 for conduction to outlet 104 and whatever the intended application.

The flow controller device 140 (FIG. 6) has been specifically designed as to spring force, throat dimensions and the like for use at the particular reduced pressure, i.e. to provide a fluid flow output of 45 PSI and lower with fixed flow rate. Thus, as may be noted from FIG. 6, the diameter of the pressure plate 162 approaches one-third of the diameter across throat portion 152 of chamber 148, and the axial position of pressure plate 162 relative to arcuate taper proceeding from point 150 to throat portion 152, will define the area of the concentric flow passage. Thus, the greater the air pressure at the inlet relative to the outlet, causing greater differential across the pressure plate 162, the more the compression of spring 176, and the narrower will become the concentric flow passage between taper portion 156 and pressure plate 162. Accordingly, even though the outlet pressure may change, the flow rate from the outlet will remain constant.

While the tubular frame 22 and the like have been referred to generally as bodies of revolution defining circular inside dimension, it should be understood that this structure may be any tubular form defining an equicentric chamber relative to the longitudinal axis, i.e. any chamber having equi-form radius for all cross-sectional dimensions. Optimally then, the respective differential plates and flow restrictor means may be similarly shaped in cross-section.

The foregoing discloses a novel flow controller device which, in turn, enables construction of a novel pressure and flow rate control apparatus that may be readily employed for diverse usage to provide air or other fluid at prescribed pressure and flow rate. The flow rate controller device may be used in any of many applications that require a fixed flow rate of liquid or gas while the outlet pressure may vary. More particularly, such equipment may be used to control the flow of gas such as air from a large compressor to obtain the proper flow rate for best operation of a pneumatic conveying system that handles such as cement, drilling mud or the like. The skid-mounted package for pressure and flow rate control provides a very effective and less expensive alternative to the use of dedicated compressor equipment in and around manufacturing plants since a unitary central pressure source may be readily adjusted and controlled for use in any of various satellite operations. The fluid pressure and flow rate control package or apparatus 100 conveniently groups the necessary equipment for controlling any of pressure, flow rate, temperature, contaminants of fluid stream, etc., and all operations are maintained interactively within a small area.

Changes may be made in combination and arrangement of elements as heretofor set forth in the specification and shown in the drawings; it being understood that change may be made in the embodiments disclosed without departing from the spirit and scope of the invention as defined in the following claims.

What is claimed is:

1. Apparatus for controlling fluid flow rate, comprising:
   frame means for allowing a fluid to flow therethrough having an inlet end, an outlet end, a throat portion therebetween and an interior wall defining a flow chamber that is an equi-centric, elongated volume having a linear central axis extending between said inlet and outlet ends, said flow chamber having a cross-sectional area perpendicular to said central axis, that varies between a maximum at the inlet end and a minimum at the throat portion proximate said inlet end;
   flow restrictor means for varying the flow rate of said fluid, having a cross-sectional area relative to said minimum at the throat portion, said flow restrictor means being supported for axial reciprocation between the inlet end and said throat portion;
   support means for slidably supporting said flow restrictor means having a cross-sectional area normal to the axis of said flow chamber; and
   spring means circumferentially disposed around said support means, for biasing said flow restrictor means toward a position in said flow chamber adjacent the inlet end having a maximum cross-sectional area, and away from the throat portion having a minimum cross-sectional area.

2. Apparatus as set forth in claim 1 wherein:
   said frame means includes a cylindrical conduit with an inside diameter defining said flow chamber having a constant cross-sectional area, said frame means includes an orifice plate secured transversely across said flow chamber proximate the inlet end, said orifice plate having an axial orifice defining a cross-sectional area less than said flow chamber cross-sectional area; and
   said flow restrictor means includes a control plug having a tapered surface adjacent the inlet end that presents less than the cross-sectional area of said flow chamber and tapers toward said orifice plate, and a differential plate rigidly connected to said control plug in spaced, axial alignment and approximating a selected cross-sectional area less than the cross-sectional area of said flow chamber.

3. Apparatus as set forth in claim 2 wherein said support means comprises:
   rod guide means for maintaining axial alignment of said flow restrictor means, secured axially in said flow chamber adjacent the outlet end; and
   rod means, slidably retained by said rod guide means in-line with said flow chamber axis, said rod means for rigidly securing and supporting said control plug and differential plate in spaced relationship.

4. Apparatus as set forth in claim 3 wherein said spring means comprises:
   a compression spring retained on said rod means between said differential plate and said rod guide means.

* * * * *